United States Patent
Bender et al.

(10) Patent No.: US 10,247,438 B2
(45) Date of Patent: Apr. 2, 2019

(54) COGNITIVE CLIMATE CONTROL BASED ON INDIVIDUAL THERMAL-COMFORT-RELATED DATA

(71) Applicant: INTERNATIONAL BUSINESS MACHINES CORPORATION, Armonk, NY (US)

(72) Inventors: Michael Bender, Rye Brook, NY (US); Gregory J. Boss, Saginaw, MI (US); Jeremy R. Fox, Georgetown, TX (US); Rick A. Hamilton, II, Charlottesville, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 15/463,162

(22) Filed: Mar. 20, 2017

(65) Prior Publication Data
US 2018/0266716 A1 Sep. 20, 2018

(51) Int. Cl.
*F24F 11/30* (2018.01)
*G06N 5/04* (2006.01)
(Continued)

(52) U.S. Cl.
CPC .............. *F24F 11/30* (2018.01); *F24F 11/62* (2018.01); *G05B 19/042* (2013.01); *G06N 5/043* (2013.01);
(Continued)

(58) Field of Classification Search
CPC ........ F24F 11/30; F24F 11/62; F24F 2120/10; F24F 2120/14; F24F 2120/20;
(Continued)

(56) References Cited

U.S. PATENT DOCUMENTS 5,156,203 A * 10/1992 Funakoshi ......... G05D 23/1905
165/207
5,762,265 A * 6/1998 Kitamura ........... G05D 23/1917
236/51

(Continued)

FOREIGN PATENT DOCUMENTS

WO    WO2015157670 A1    10/2015

OTHER PUBLICATIONS

M. Feldmeier and J. A. Paradiso, "Personalized HVAC control system," 2010 Internet of Things (IOT), Tokyo, 2010, pp. 1-8.*

(Continued)

*Primary Examiner* — Christopher E. Everett
(74) *Attorney, Agent, or Firm* — Michael Petrocelli, Esq.; Kevin P. Radigan, Esq.; Heslin Rothenberg Farley & Mesiti P.C.

(57) ABSTRACT

A facility is provided for controlling climate settings for a space. The facility includes ascertaining by a cognitive control, thermal-comfort-related data for one or more individuals within the space, and determining climate settings for a climate system of the space using, at least in part, the thermal-comfort-related data of the individual(s) within the space. In addition, the facility includes identifying, by the cognitive control, a climate adjustment to be made for an individual of the individual(s) based, at least in part, on thermal-comfort-related data acquired for the individual, and based on identifying the climate adjustment, automatically controlling one or more climate adjusting devices of the climate system associated with a location of the individual within the space to enhance climate of the individual within the space.

17 Claims, 7 Drawing Sheets

(51) Int. Cl.
F24F 11/62 (2018.01)
G05B 19/042 (2006.01)
F24F 11/56 (2018.01)
F24F 11/63 (2018.01)
F24F 11/52 (2018.01)
F24F 11/64 (2018.01)
F24F 120/10 (2018.01)
F24F 120/20 (2018.01)
F24F 120/14 (2018.01)

(52) U.S. Cl.
CPC ............. F24F 11/52 (2018.01); F24F 11/56 (2018.01); F24F 11/63 (2018.01); F24F 11/64 (2018.01); F24F 2120/10 (2018.01); F24F 2120/14 (2018.01); F24F 2120/20 (2018.01); G05B 2219/2614 (2013.01)

(58) Field of Classification Search
CPC .. F24F 11/52; F24F 11/63; F24F 11/64; F24F 11/56; G05B 19/048; G05B 2219/2614; G06N 5/043
See application file for complete search history.

(56) References Cited

U.S. PATENT DOCUMENTS

| | | | | |
|---|---|---|---|---|
| 2003/0216838 A1* | 11/2003 | Dudley | .............. | G05D 23/1902 700/277 |
| 2008/0277486 A1* | 11/2008 | Seem | .................... | H04L 67/125 236/49.3 |
| 2009/0065596 A1* | 3/2009 | Seem | ....................... | F24F 11/30 236/51 |
| 2010/0036533 A1* | 2/2010 | Masuda | ................... | F24F 11/30 700/278 |
| 2010/0077241 A1* | 3/2010 | Piazza | ................... | G06F 1/3209 713/320 |
| 2010/0262298 A1* | 10/2010 | Johnson | ................ | F24F 11/001 700/277 |
| 2011/0295544 A1* | 12/2011 | Ueda | ........................ | F24F 11/30 702/130 |
| 2012/0031984 A1* | 2/2012 | Feldmeier | ................ | F24F 11/30 236/49.3 |
| 2012/0066168 A1* | 3/2012 | Fadell | .................... | G05B 15/02 706/52 |
| 2012/0158203 A1* | 6/2012 | Feldstein | .............. | G06F 1/3231 700/295 |
| 2012/0310376 A1* | 12/2012 | Krumm | .................. | G05B 15/02 700/31 |
| 2013/0073094 A1* | 3/2013 | Knapton | ................ | G05B 13/02 700/278 |
| 2013/0102852 A1* | 4/2013 | Kozloski | .................. | A61B 5/00 600/300 |
| 2013/0232996 A1* | 9/2013 | Goenka | .................... | B60N 2/56 62/3.61 |
| 2014/0031992 A1* | 1/2014 | Bergman | ................. | F24F 11/00 700/276 |
| 2014/0039691 A1* | 2/2014 | Gupta | .................. | F24F 11/0001 700/278 |
| 2014/0045532 A1* | 2/2014 | Fraccaroli | ............... | H04W 4/02 455/456.3 |
| 2014/0135997 A1* | 5/2014 | Bradley | ............... | F24F 11/0001 700/278 |
| 2014/0207292 A1 | 7/2014 | Ramagem et al. | | |
| 2014/0367079 A1* | 12/2014 | DiFulgentiz, III | ... | F24F 11/0034 165/237 |
| 2015/0168002 A1* | 6/2015 | Plitkins | ................ | F24F 11/0034 165/237 |
| 2015/0316286 A1* | 11/2015 | Roher | ...................... | F24F 11/30 700/276 |
| 2015/0338117 A1* | 11/2015 | Henneberger | ......... | G05B 15/02 700/276 |
| 2016/0195856 A1 | 7/2016 | Spero | | |
| 2016/0320081 A1 | 11/2016 | Nikovski | | |
| 2016/0354027 A1 | 12/2016 | Benson et al. | | |
| 2017/0138623 A1* | 5/2017 | Song | ....................... | F24F 11/30 |

OTHER PUBLICATIONS

Mel et al., "The NIST Definition of Cloud Computing," National Institute of Standards and Technology, Information Technology Laboratory, Special Publication 800-145, Sep. 2011, (pp. 1-7).
International Business Machines Corporation (IBM), "z/Architecture Principles of Operation," IBM® Publication No. SA22-7832-10, Eleventh Edition, Mar. 2015, pp. 1-1732.
International Business Machines Corporation (IBM), "Power ISA™ Version 2.07B," International Business Machines Corporation, Apr. 9, 2015, pp. 1-1527.

* cited by examiner

300

WHAT IS CLAIMED IS:

CONTROLLING CLIMATE SETTINGS FOR A SPACE BY:

- ASCERTAINING, BY A COGNITIVE CONTROL, THERMAL-COMFORT-RELATED DATA FOR ONE OR MORE INDIVIDUALS WITHIN THE SPACE;
- DETERMINING CLIMATE SETTINGS FOR A CLIMATE SYSTEM OF THE SPACE USING, AT LEAST IN PART, THE THERMAL-COMFORT-RELATED DATA OF THE ONE OR MORE INDIVIDUALS WITHIN THE SPACE;
- IDENTIFYING, BY THE COGNITIVE CONTROL, A CLIMATE ADJUSTMENT TO BE MADE FOR AN INDIVIDUAL OF THE ONE OR MORE INDIVIDUALS BASED, AT LEAST IN PART, ON THERMAL-COMFORT-RELATED DATA ACQUIRED FOR THE INDIVIDUAL; AND
- BASED ON IDENTIFYING THE CLIMATE ADJUSTMENT, AUTOMATICALLY CONTROLLING ONE OR MORE CLIMATE ADJUSTING DEVICES OF THE CLIMATE SYSTEM ASSOCIATED WITH A LOCATION OF THE INDIVIDUAL WITHIN THE SPACE TO ENHANCE THERMAL COMFORT OF THE INDIVIDUAL WITHIN THE SPACE

305

IN WHICH ASCERTAINING THE THERMAL-COMFORT-RELATED DATA INCLUDES MONITORING THE ONE OR MORE INDIVIDUALS WITHIN THE SPACE TO OBTAIN CURRENT PHYSIOLOGICAL DATA FOR THE ONE OR MORE INDIVIDUALS WITHIN THE SPACE, THE THERMAL-COMFORT-RELATED DATA INCLUDING THE OBTAINED CURRENT PHYSIOLOGICAL DATA FOR THE ONE OR MORE INDIVIDUALS

310

IN WHICH THE MONITORING INCLUDES USING ONE OR MORE PHYSIOLOGICAL MONITORS ASSOCIATED WITH THE ONE OR MORE INDIVIDUALS TO OBTAIN THE CURRENT PHYSIOLOGICAL DATA

315

WHERE THE MONITORING THE ONE OR MORE INDIVIDUALS USES AT LEAST ONE OF A WEARABLE SENSOR, A SPACE BASED SENSOR, A VIDEO CAMERA, A SMARTPHONE, A SMARTWATCH, AN INTERNET OF THINGS DEVICE, OR NATURAL LANGUAGE PROCESSING OF VERBAL OR TEXT QUEUES

320

IN WHICH THE ASCERTAINING INCLUDES OBTAINING A PREFERRED AMBIENT TEMPERATURE FOR EACH INDIVIDUAL OF THE ONE OR MORE INDIVIDUALS, THE THERMAL-COMFORT-RELATED DATA INCLUDING THE PREFERRED AMBIENT TEMPERATURE(S) FOR THE ONE OR MORE INDIVIDUALS

325

IN WHICH DETERMINING THE CLIMATE SETTINGS INCLUDES DETERMINING THE CLIMATE SETTINGS THAT MEET A MAJORITY OF THE PREFERRED AMBIENT TEMPERATURE(S) FOR THE ONE OR MORE INDIVIDUALS WITHIN THE SPACE

FIG. 3A

330 — IN WHICH THE ASCERTAINING INCLUDES REFERENCING HISTORICAL DATA FOR THE ONE OR MORE INDIVIDUALS INDICATIVE OF THE PREFERRED AMBIENT TEMPERATURE(S), AND DETERMINING THE CLIMATE SETTINGS INCLUDES WEIGHTING THE PREFERRED AMBIENT TEMPERATURE OF ONE INDIVIDUAL OF THE ONE OR MORE INDIVIDUALS BASED ON A PROJECTED LENGTH OF TIME THAT THE ONE INDIVIDUAL IS TO BE WITHIN THE SPACE

335 — FURTHER INCLUDING ASCERTAINING, BY THE COGNITIVE CONTROL, THE PROJECTED LENGTH OF TIME THAT THE ONE INDIVIDUAL IS TO BE IN THE SPACE BY REFERENCING AN ELECTRONIC CALENDAR OF THE ONE INDIVIDUAL

340 — IN WHICH THE IDENTIFYING FURTHER INCLUDES REFERENCING HISTORICAL DATA TO COGNITIVELY ASCERTAIN A PREFERRED AMBIENT TEMPERATURE FOR THE INDIVIDUAL, AND BASED ON THE PREFERRED AMBIENT TEMPERATURE, AND THE ASCERTAINED THERMAL-COMFORT-RELATED DATA FOR THE INDIVIDUAL, IDENTIFYING THE CLIMATE ADJUSTMENT TO BE MADE FOR THE INDIVIDUAL

345 — FURTHER INCLUDING ACCOUNTING FOR A CLIMATE IMPACT WITHIN THE SPACE IN CONTROLLING THE CLIMATE ADJUSTING DEVICE(S) ASSOCIATED WITH THE LOCATION OF THE INDIVIDUAL WITHIN THE SPACE, THE ACCOUNTING INCLUDING ADJUSTING ONE OR MORE OTHER CLIMATE SETTINGS FOR THE SPACE BASED ON THE CONTROLLING OF THE CLIMATE ADJUSTING DEVICE(S) ASSOCIATED WITH THE LOCATION OF THE INDIVIDUAL WITHIN THE SPACE

350 — FURTHER INCLUDING REFERENCING, BY THE COGNITIVE CONTROL, AN ELECTRONIC CALENDAR OF THE INDIVIDUAL TO DETERMINE WHERE THE INDIVIDUAL IS COMING FROM PRIOR TO ENTERING THE SPACE, AND BASED AT LEAST IN PART THEREON, PROVIDING ONE OR MORE SHORT TERM SETTINGS OF THE CLIMATE ADJUSTING DEVICE(S) ASSOCIATED WITH THE LOCATION OF THE INDIVIDUAL WITHIN THE SPACE

355 — IN WHICH THE CONTROLLING INCLUDES CONTINUALLY MODIFYING CONTROL OF THE CLIMATE ADJUSTING DEVICE(S) FOR A PERIOD OF TIME BASED ON HISTORICAL DATA FOR THE INDIVIDUAL AND THE ASCERTAINED THERMAL-COMFORT-RELATED DATA OF THE INDIVIDUAL

FIG. 3B

COGNITIVE CLIMATE CONTROL BASED ON INDIVIDUAL THERMAL-COMFORT-RELATED DATA

BACKGROUND

Thermal comfort is a condition of mind that expresses satisfaction with a thermal environment and is assessed by subjective evaluation. Maintaining the standard of thermal comfort for individuals within a space, for instance, occupants of a building or other enclosure such as a vehicle, continues to be an area of research.

Thermal neutrality is maintained when heat generated by an individual's metabolism is allowed to dissipate, thus maintaining thermal equilibrium with the surroundings. The main factors that influence thermal comfort are those which determine heat gain and loss, mainly metabolic rate, clothing insulation, air temperature, mean radiant temperature, air speed and relative humidity. Psychological parameters such as individual expectations also affect thermal comfort.

Oftentimes, one or more individuals of a plurality of individuals within a space may be too hot or too cold, regardless of whether other individuals may be comfortable. This phenomenon is based, in part, on the personal temperature preferences of the individuals, in combination with, for instance, activities that the individuals are currently or recently engaged. Age and physical condition of the individual may also play a factor in thermal comfort at a given temperature. For instance, temperature which may feel comfortable for a young person in a healthy state, may seem too hot for a person with extra weight or with one or more ailments. Similarly, a comfortable temperature for a younger individual may be too cool for an older individual. In addition, even at an individual level, reaction to temperature can differ for a variety of reasons. For instance, a temperature which is considered hot in the summer may cause the same individual to feel cold in the winter. Thermal comfort, or temperature perception, may thus vary from individual to individual, and universally comfortable climate conditions may be difficult to achieve within a space.

SUMMARY

Shortcomings of the prior art are overcome and additional advantages are provided through the provision of a method of providing climate settings for a space. The method includes ascertaining, by a cognitive control, thermal-comfort-related data for one or more individuals within the space, and determining climate settings for a climate system of the space using, at least in part, the thermal-comfort-related data for the one or more individuals within the space. In addition, the method includes identifying, by the cognitive control, a climate adjustment to be made for an individual of the one or more individuals based, at least in part, on thermal-comfort-related data ascertained for the individual, and based on identifying the climate adjustment, automatically controlling one or more climate adjusting devices of the climate system associated with a location of the individual within the space to enhance thermal comfort of the individual within the space.

Advantageously disclosed herein, is a climate control process for a space, where the climate control processing is cognitive-based to address individual physiological metrics and preferences. In one or more aspects, the climate control process may cognitively learn preferences of individuals, and physiological patterns of the individuals, as well as their approach to thermal management. The control processing disclosed allows the cognitive system to understand physiological changes of the individuals within, for instance, a particular climate zone of a space, and to automatically adjust one or more climate settings, such as temperature, humidity, fresh air blend, etc. to better accommodate or enhance thermal comfort of the individual within the space.

In one or more implementations, ascertaining the thermal-comfort-related data may include monitoring the one or more individuals within the space to obtain current physiological data for the one or more individuals within the space, the thermal-comfort-related data including the obtained current physiological data for the one or more individuals. By way of example, the monitoring may include using one or more physiological monitors associated with the one or more individuals to obtain the current physiological data. As a further example, the monitoring of the one or more individuals may use one or more of a wearable sensor, a space-based sensor, a video camera, a smartphone, a smartwatch, an Internet of Things device, or natural language processing of verbal or text queues.

In one or more embodiments, the ascertaining may include obtaining a preferred ambient temperature for each individual of the one or more individuals, wherein the thermal-comfort-related data includes the preferred ambient temperature(s) for the one or more individuals. In one or more implementations, determining the climate settings may include determining the climate settings that meet a majority of the desired ambient temperature(s) for the one or more individuals within the space. By way of further example, the ascertaining may include referencing historical data for the one or more individuals indicative of the preferred ambient temperature(s), and determining the climate settings may include weighting the preferred ambient temperature of one individual of the one or more individuals based on a projected length of time that the one individual is to be within the space. By way of example, ascertaining, by the cognitive control, the projected length of time that the one or more individuals to be within the space may be accomplished by referencing an electronic calendar of the one individual.

In one or more embodiments, identifying the climate adjustment may include referencing historical data to cognitively ascertain a preferred ambient temperature for the individual, and based on the preferred ambient temperature, and the ascertained thermal-comfort-related data for the individual, identifying the climate adjustment to be made for the individual. Further, the method may include accounting for a climate impact within the space in controlling the climate adjusting device(s) associated with the location of the individual within the space. The accounting may include adjusting one or more other climate settings for the space based on the controlling of the climate adjusting device(s) associated with the location of the individual within the space.

In one or more embodiments, the method may further include referencing, by the cognitive control, an electronic calendar of the individual to determining where the individual is coming from prior to entering the space, and based at least in part thereon, providing one or more short-term settings of the climate adjusting device(s) associated with the location of the individual within the space. Further, in one or more implementations, the automatically controlling may include modifying control of the climate adjusting device(s) for a period of time based on historical data for the individual and the ascertained thermal-comfort-related data of the individual.

Systems and computer program products relating to one or more aspects are also described and claimed herein.

Further, services relating to one or more aspects are also described and may be claimed herein.

Additional features and advantages are realized through the techniques disclosed herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 3A-3B depict a further embodiment of climate control processing, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, for climate control of a space to enhance thermal comfort of one or more individuals within the space.

Disclosed herein, in one or more aspects, is auto-adjusting, climate control processing for a space. The climate control processing is cognitive based since each individual may have different physiological metrics and preferences, which may be factored into the control process to obtain climate settings for a space. In one or more aspects, the auto-adjusting system may cognitively learn preferences of individuals, and physiological patterns of the individuals, as well as their approach to thermal management. With current thermal-comfort-related data (e.g., physiological data) and historical based, learned preferences for individuals within a space, the auto-adjusting, climate control system is able to enhance thermal comfort of the individuals within a space by, for instance, determining climate settings for a climate system of the space (e.g., a base temperature, humidity, airflow, etc. for the space), and by providing individual climate adjustments, via control of one or more climate adjusting devices associated with a location where the individual is currently located within the space to enhance thermal comfort of the individual.

Figure 1:
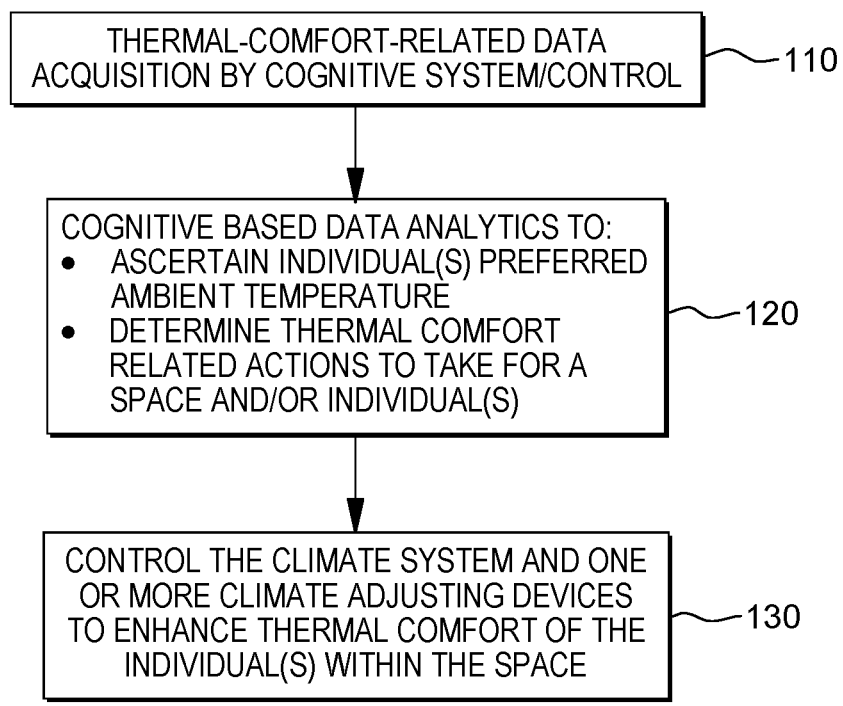
FIG. 1 depicts one embodiment of climate setting control processing, in accordance with one or more aspects of the present invention.

FIG. 1 depicts on embodiment of an auto-adjusting, climate control process, generally denoted 100, in accordance with one or more aspects of the present invention. As illustrated, climate control process 100 includes acquiring, by a cognitive system or control, thermal-comfort-related data for, for instance, one or more individuals within a space 110. The one or more individuals may be all individuals or less than all individuals within the space. Cognitive based data analytics may be performed to, for instance, ascertain individual preferred ambient temperatures, as well as determine thermal-comfort-related actions to take for the space and/or for an individual(s) within the space 120. The thermal-comfort-related actions to take may include, for instance, determining climate settings for a climate system of the space, as well as identifying by the cognitive system/control one or more climate adjustments to be made for one or more individuals within the space. In particular, the thermal-comfort-control process may include controlling the climate system associated with the space, and one or more climate adjusting devices (e.g., associated with the climate system) to enhance thermal comfort of the individual(s) within the space 130.

By way of example, the cognitive based data analytics may be used to determine a base temperature for a space which meets a majority of preferred ambient temperatures of individuals within the space, and climate settings to achieve the base temperature. In addition, the cognitive system may identify one or more climate adjustments to be made for one or more individuals within the space, such as via automated control of one or more climate adjusting devices of the climate system. As explained further herein, a variety of technologies or devices could be employed for individual climate adjustments or modifications, e.g., adjust temperature of a chair within which the individual is seated, open/close individual vents based on location of the individual within the space, etc.

Figure 2:
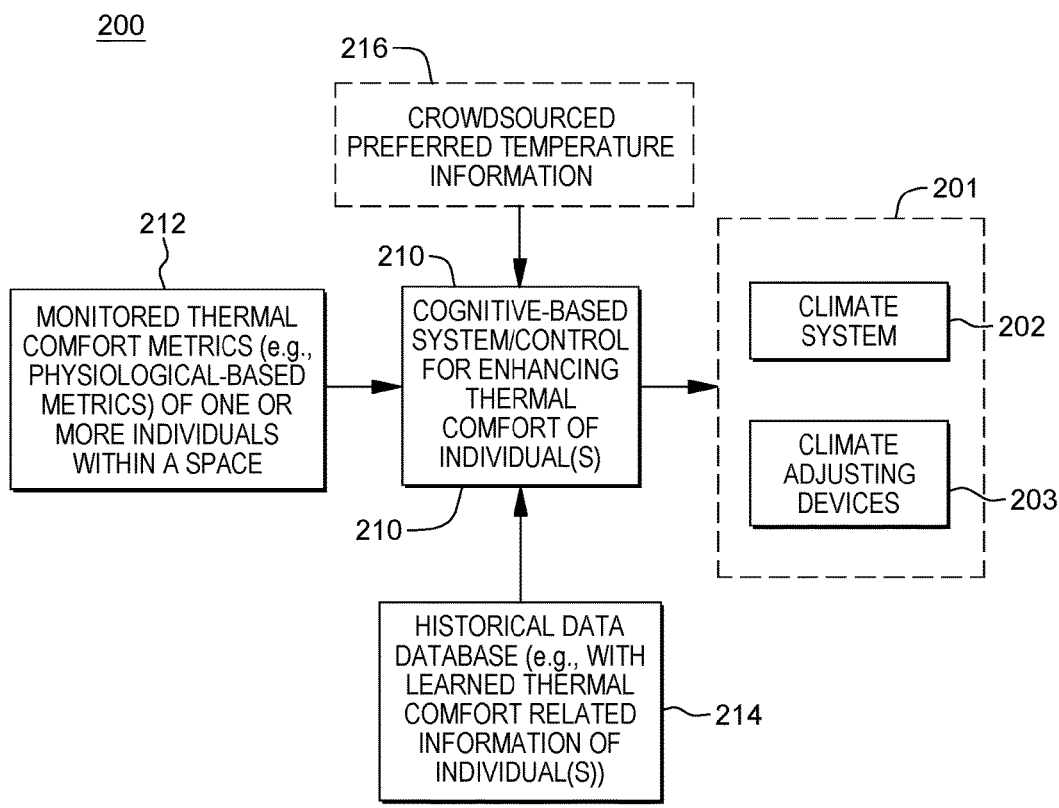
FIG. 2 illustrates one embodiment of a climate control system, in accordance with one or more aspects of the present invention.

FIG. 2 depicts one embodiment of a climate control system 200, in accordance with one or more aspects of the present invention. Climate control system 200 provides, in one or more aspects, auto-adjusting of climate settings for a climate system 202 associated with a space 201, as well as controlling climate adjusting device(s) 203 within the space. In one or more embodiments, climate adjusting device(s) 203 may be part of climate system 202, or separate. By way of example, climate system 202 may be, or include, a heating, ventilation, and air-conditioning (HVAC) system for space 201, which provides heating and cooling to the space, as well as (if desired) other climate adjustments, such as humidity, fresh air blend, etc. The climate adjusting device(s) 203 may be any of a variety of climate affecting devices associated with a location where the individual is located within space 201. For instance, the climate adjusting device(s) may include one or more vents that control temperature in a zone of the space and/or rate of air egressing from the vents to provide, for instance, burst or sustained settings. In other embodiments, heated and/or cooled chairs could be provided to change temperature, and/or zones of heated or cooled flooring could be provided as adjustable device examples.

As discussed, climate control system 200 includes a cognitive-based system or for enhancing climate of individuals 210. In one or more embodiments, cognitive-based system 210 may be, or may utilize, for instance, a cloud based system. One such cognitive system is the Watson™ system available from International Business Machines Corporation of Armonk, N.Y., USA. The Watson™ system is an application of advanced natural language processing, information retrieval, knowledge representation and reasoning, and machine-learning technologies in the field of domain question answering. The Watson™ system is built on International Business Machines Corporation's DeepQA™ technology used for hypothesis generation, massive evidence gathering, analysis, and scoring.

In one or more embodiments, cognitive-based system/control 210 acquires or receives 212 monitored thermal comfort metrics (i.e., thermal-comfort-related data) for one or more individuals within space 201. The thermal-comfort-related data may include, for instance, physiological-based metrics, as well as other information such as verbal or typed comments collected using natural language processing. Additionally, a historical data database 214 may be provided with, for instance, learned thermal-comfort-related information for the one or more individuals within space 201 subscribing to the climate control process or service.

Still further, in one or more embodiments, climate control system 200 may include or ascertain crowdsourced preferred temperature information 216, which may be obtained to facilitate providing base climate settings for space 201 customized to the particular individuals within the space at a particular time, as explained further herein.

Advantageously, the climate control system and process disclosed herein connect physiological measurements and/or biometric data from a collection of sources (such as smartwatches, wearable Internet of Things devices, etc.) to a cognitive based control of the climate system 202 and associated climate adjusting device(s) 203. The control processing disclosed herein allows the cognitive system 210 to understand the physiological changes of the individuals within, for instance, a particular climate zone of a space, and to automatically adjust one or more of temperature, humidity, fresh air blend, and/or other settings to better accommodate or enhance thermal comfort of the individual(s) who have opted to share their data with the system. As disclosed, a smart climate system may be employed to establish climate settings for a particular climate zone of the space, such as a room, or workspace, and when one or more climate adjustments are identified for a particular individual, to modify one or more climate adjusting devices associated with the location of the individual within the space to enhance thermal comfort of the individual(s).

Advantageously, the climate control system and process disclosed herein are able to control or override climate settings, such as thermostat controls, via (at least in part) physiological metrics obtained from the individuals within the space, such as from wearable sensors, through cognitive based learning utilizing the individual's physiological data. The cognitive based methodology disclosed may learn personal temperature preferences aided by wearable sensors to determine thermal comfort of an individual, and the system is able to provide known or learned preferential climate treatments based on various conditions, including current or recent conditions experienced by the individual.

By way of further example, the climate control system and process may be employed to adjust climate settings of a climate system for a space using anonymous crowdsourced temperature data. For instance, upon entry into a space, an individual may be asked if they wish to opt in to the climate control service, which allows the individual to participate in the temperature control application. All votes could be aggregated to determine if individuals within the space would like a lower temperature, higher temperature, or are thermally comfortable. In application, when an individual arrives within a space, the temperature may be comfortable, however over time, the space may fill up, and by sharing, even in an anonymous fashion, physiological measurements with the climate control system, the control system is able to auto-adjust climate settings based on sensing that a sufficient number of individuals within the space have become thermally uncomfortable. This type of climate control system could be employed in a variety of environments, including, for instance, workplaces, public locations, restaurants, stores, mass transit, or anywhere where individuals within a space would like to participate in changing or controlling the environmental climate settings on demand via crowdsourcing input.

As another example, a personalized temperature change may be affected using the climate control system and process disclosed herein. For instance, upon entry into a space, such as an office environment, configured with cubicles or zones that contain one or more individually controllable climate adjusting devices, such as one or more Internet of Things (IoT) vents, then the individual may be asked if they wish to opt in to the personalized climate control service. Assuming so, the control process or system may allow physiological data to be used to open or close automatically the climate adjusting device(s) associated with the location where the individual is located within the space based, for instance, on the individual's proximity to the device, and the individual's historical data. The cognitive system may also utilize a learning loop, with input from wearable sensors associated with the individual, to cognitively learn the individual's thermal preferences and adjust the climate adjusting devices accordingly. Further, other physiological measurements of temperature comfort, such as analyzing video of the individual to ascertain, for instance, sweat or goosebumps, etc., could be employed in addition to, or alternatively, as a monitoring or triggering mechanism.

In one or more embodiments, clothing-based temperature management may be utilized in combination with the climate control processing disclosed herein. For instance, with wearable sensors, how an individual is dressed may be identified, and the temperature within a space, such as within a vehicle, may be detected and compared to the temperature outside the vehicle. If a user is wearing a jacket within the vehicle, the system can adjust the temperature within the vehicle given that clothing item, and the wearable sensor feedback. New types of clothing may have embedded technologies to communicate with wearable sensors, or perhaps be wearable themselves. This would serve as another data collection point for the cognitive system to help make decisions regarding the cognitive temperature management of the individual(s) within a space. Thus, the cognitive learning and adjusting may be extended to, for instance, a vehicle environment which may have climate adjusting devices, such as heated and/or cooled seats.

As a further example, as an individual enters a vehicle, the vehicle could automatically wirelessly connect to wearable sensors on the individual, and sense whether the individual is hot or cold upon entering the vehicle. The climate control system and processing disclosed herein may extend beyond any traditional temperature regulators within a vehicle today through the use of the dynamic monitoring and communication of wearable sensor data for the one or more individuals within the vehicle's cabin. Further, the climate control system and process disclosed herein can be used to cognitively control the needs and preferences of individuals within the vehicle by regulating or providing different parts of the vehicle cabin with different air temperatures.

As a further consideration, an individual's climate preference(s) may change due to a current or recent environment, or activity, or for other reasons. For instance, if an individual is stepping out of a shower, the climate control system could provide bursts of hot air if the individual is cold (such as during the winter). Further, if the individual has just completed an activity, such as a hike on a hot day, the climate control system could provide smaller burst of cold air due to the individual being able to cool off faster when perspiring. Conversely, on a colder day, a wet individual could be detected and provided with extra heat as required to achieve thermal comfort based on sensed or acquired thermal-comfort-related data.

By way of further explanation, the climate control processing and system disclosed herein may acquire thermal-comfort-related data, for instance, at system startup. Data may be accumulated using a variety of data acquisition elements, sensors, monitors, etc., associated with, for instance, one or more individuals within a space to be climate controlled. For example, the individual(s) within the space may have one or more wearable sensors, which are initially identified and wirelessly connected to. Physiological data of the individual(s) may be collected from the wearable sensors, including, for instance, current body temperature, skin perspiration/wetness, the user's location within a space, goosebumps, shivering, adding or removing clothing layers, heart rate, etc. Additionally, or alternatively, information may be collected from video cameras monitoring the space, such as skin perspiration/wetness, skin color (e.g., flush), goosebumps, shivering, adding or removing layers of clothing, etc. Still further, natural language processing of captured verbal and/or typed comments may be used by the system to identify whether the individual within the space is cold, hot or comfortable. In addition, climate settings indicating the current room temperature, such as via a thermostat, may be obtained. Once the thermal comfort related data is obtained, the data may be cognitively processed. However, the obtaining of data may be continuous, or may be repeated in a loop fashion, as desired to constantly or periodically adjust climate conditions within the space based on thermal-comfort-related data ascertained from the one or more individuals within the space.

As indicated in FIG. 1, the thermal-comfort-related data is then processed via cognitive-based data analytics to, for instance, determine what climate settings to set for space. In particular, once the thermal-comfort-related data is acquired, the system is to automatically determine what climate setting actions to take. The climate control system may maintain temperature settings until inputs from the sensors to the analytic engine (i.e., cognitive control) detect a need for a change. Through trial and error, the cognitive system may learn preferred temperature values, as well as burst rates for heating or cooling of the space. For instance, the system may learn or create an average temperature that meets the majority of the individual preferences within a space. This could be, in one or more embodiments, by using crowdsourced data. For instance the cognitive system may analyze coldest and/or hottest temperatures that are acceptable for individuals within the space. If a modification of room temperature is still needed to meet needs for thermal comfort, settings may be adjusted such that more individuals may be in the outer limit range of preferred temperature, with the thermostat being set to the highest and/or lowest range possible. Further, if an individual's electronic calendar shows that the individual will only be in a space for a short period of time, bursts of a changed temperature can be enabled, but that individual's preferences may be weighted lower when determining the desired average temperature for this space. The output of this cognitive analysis may be a message or control setting sent to the climate system, such as the HVAC system associated with this space, in order to modify one or more settings of the system.

In addition, the current location and personal preferences of each individual within the space may be determined using, for instance, wearable sensor data. From this information, further decisions, such as one or more climate adjustments to be made for an individual, may be made by the cognitive system. More particularly, once data has been collected, the system can determine what actions to take. As noted, the system may maintain temperature settings as is until inputs from the sensors to the analytic engine detect a need for a climate change. The system may learn through trial and error preferred ambient temperature and burst rates for individuals within the space, and the system may learn impacts of changing temperatures for an individual on their neighbor. For instance, if individual A is sitting next to individual B, opening an individual vent for individual A to cool individual A may require that a vent for individual B get partial closed or fan speed lowered. This impact limiting, or accounting, may be through analyzing, for instance, thermostats within a space, as well as understanding the impact of one climate adjusting device change on other locations in the space. The output of this analyzing may be a climate adjustment that is utilized to control one or more climate adjusting devices associated with the location of the individual within the space to enhance thermal comfort of the individual.

Once the climate settings and climate adjustments are identified, the climate control system may be deploy a climate solution to the space. This could be accomplished in one or more embodiments, through control of climate adjusting devices, such as IoT controlled HVAC devices or components. Vents that control temperature and rate of air egress from the vent may be used to create bursts or sustained settings as desired. In other embodiments, heating or cooling chairs could be utilized to change temperature for an individual, and/or heated or cooled floor zones may be used to individualize thermal comfort of people within the room. The climate control system may utilize the derived output to create an IoT feed to the HVAC system to engage the appropriate available components of the system for a determined amount of time. For instance, by increasing or decreasing fan speeds, quick burst of cool or hot air may be provided to enhance thermal comfort of the individuals within the space, as desired.

As noted, a variety of sensors or monitors may be employed to ascertain thermal-comfort-related data of one or more individuals within the space. Examples might include a camera capturing an individual sweating or shivering within the space, natural language processing of a phone communication where the person indicates or types that they are cold or hot, a wearable sensor, such as a shirt worn sensor may detect sweating and/or skin temperature of the individual, a video camera may capture a flushed face or an activity such as exercising which raises the body temperature of the individual.

In further examples, the climate adjusting devices may be any component or subsystem of the climate system, or may be components that are separate from the climate system associated with the space. By way of example, vents or fans within the space may be controlled at different locations depending upon the thermal comfort of individuals within the locations to either increase or decrease heating or cooling in those locations. Further, heated or cooled seats may be employed within the space, as well as radiant heating or cooling of different zones of the space. Further, infrared heating could be employed in different areas to individualize heating within the space depending on thermal comfort of the individuals.

By way of still further example, FIGS. 3A & 3B depict a method of controlling climate settings for a space, in accordance with one or more aspects of the present invention. As illustrated, the controlling climate settings for a space 300 includes, in one or more aspects, ascertaining, by a cognitive control or system, thermal-comfort-related data for one or more individuals within the space, and determining climate settings for a climate system of the space using, at least in part, the thermal-comfort-related data of the one or more individuals within the space. Additionally, the process includes identifying, by the cognitive control, a climate adjustment to be made for an individual of the one or more individuals based, at least in part, on thermal-comfort-related data ascertained for the individual, and based on identifying the climate adjustment, automatically controlling one or more climate adjusting devices of the climate system associated with a location of the individual within the space to ensure thermal comfort of the individual within the space.

In one or more embodiments, ascertaining the thermal comfort related data may include monitoring the one or more individuals to obtain current physiological data for the one or more individuals within the space, where the thermal comfort related data includes the obtained current physiological data for the one or more individuals 305. For instance, the monitoring may include using one or more physiological monitors associated with the one or more individuals to obtain the current physiological data 310. In one or more embodiments, the monitoring of the one or more individuals may use one or more of a wearable sensor, a space-based sensor, a video camera, a smartphone, a smartwatch, an Internet of Things (IoT) device, or natural language processing of verbal or text-based queues 315.

In one or more embodiments, ascertaining the thermal-comfort-related data may include obtaining a preferred ambient temperature for each individual of the one or more individuals, wherein the thermal-comfort-related data includes the preferred ambient temperature(s) for the one or more individuals 320. Further, in one or more implementations, determining the climate settings may include determining the climate settings that meet a majority of preferred ambient temperature(s) for the one or more individuals within the space 325. In one or more embodiments, ascertaining the thermal-comfort-related data may include referencing historical data for the one or more individuals indicative of the preferred ambient temperature(s), and determining the climate settings may include weighting the preferred temperature of the one individual of the one or more individuals based on a projected length of time that the one individual is to be within the space 330. For instance, ascertaining, by the cognitive control, the projected length of time that the one individual is to be within the space may be accomplished by referencing an electronic calendar of the individual 335.

In one or more embodiments, identifying the climate adjustment may include referencing historical data to cognitively ascertain a preferred ambient temperature for the individual, and based on the preferred ambient temperature and the ascertained thermal-comfort-related data for the individual, identifying the climate adjustment to be made for the individual 340. Further, controlling the climate settings may include accounting for a climate impact within the space in controlling the climate adjusting device(s) associated with the location of the individual within the space 345. The accounting may include adjusting one or more other climate settings for the space based on the controlling of the climate adjusting device(s) associated with the location of the individual within the space. In one or more embodiments, the controlling climate settings may further include referencing, by the cognitive control, an electronic calendar of the individual to determine where the individual is coming from prior to entering the space, and based at least in part thereon, providing one or more short-term settings of the climate adjusting device(s) associated with the location of the individual within the space 350. In one or more embodiments, the controlling may include continuing modifying control of the climate adjusting device(s) for a period of time based on historical data for the individual and the ascertained of thermal-comfort-related data of the individual 355.

Further exemplary embodiments of a computing environment to implement one or more aspects of the present invention are described below with reference to FIGS. 4-6.

Figure 4:
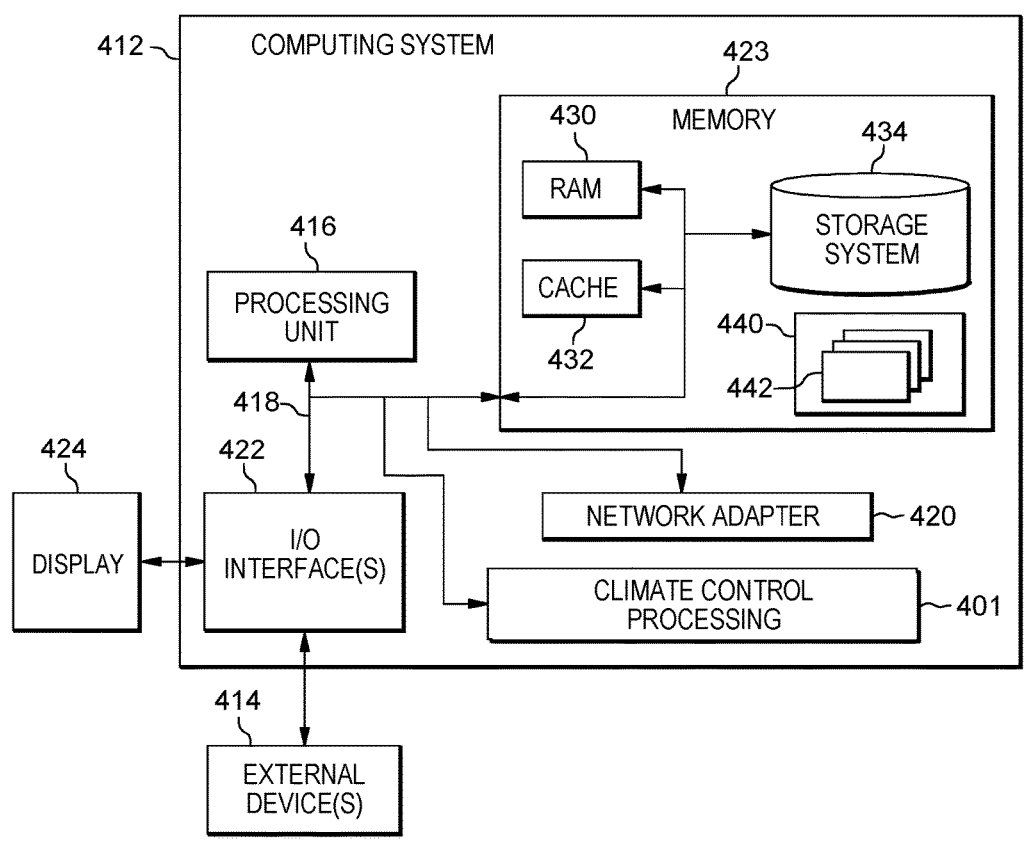
FIG. 4 depicts one embodiment of a computing system which may implement or facilitate implementing climate control processing, in accordance with one or more aspects of the present invention.

By way of further example, FIG. 4 depicts one embodiment of a computing environment 400, which includes a computing system 412. Examples of well-known computing systems, environments, and/or configurations that may be suitable for use with computer system 412 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 412 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 4, computing system 412, is shown in the form of a general-purpose computing device. The components of computing system 412 may include, but are not limited to, one or more processors or processing units 416, a system memory 423, and a bus 418 that couples various system components including system memory 423 to processor 416.

In one embodiment, processor 416 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 412 may include a variety of computer system readable media. Such media may be any available media that is accessible by computing system 412, and it includes both volatile and non-volatile media, removable and non-removable media.

System memory 423 can include computer system readable media in the form of volatile memory, such as random access memory (RAM) 430 and/or cache memory 432. Computing system 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 418 by one or more data media interfaces. As described below, memory 423 may include at least one program product having a set (e.g., at least one) of program modules that are configured to carry out the functions of embodiments of the invention.

Program/utility 440, having a set (at least one) of program modules 442, may be stored in memory 432 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Alternatively, a climate control processing, module, logic, etc., 401 may be provided within computing environment 412.

Computing system 412 may also communicate with one or more external devices 414 such as a keyboard, a pointing device, a display 424, etc.; one or more devices that enable a user to interact with computing system 412; and/or any devices (e.g., network card, modem, etc.) that enable computing system 412 to communicate with one or more other computing devices. Such communication can occur via Input/Output (I/O) interfaces 422. Still yet, computing system 412 can communicate with one or more networks such as a local area network (LAN), a general wide area network (WAN), and/or a public network (e.g., the Internet) via network adapter 420. As depicted, network adapter 420 communicates with the other components of computing system, 412, via bus 418. It should be understood that although not shown, other hardware and/or software components could be used in conjunction with computing system 412. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 4. Computer system/server 412 of FIG. 4 may be practiced in distributed cloud computing environments where tasks are performed by remote processing devices that are linked through a communications network. In a distributed cloud computing environment, program modules may be located in both local and remote computer system storage media including memory storage devices. Computer system/server 412 is capable of being implemented and/or performing any of the functionality set forth hereinabove.

Figure 5:
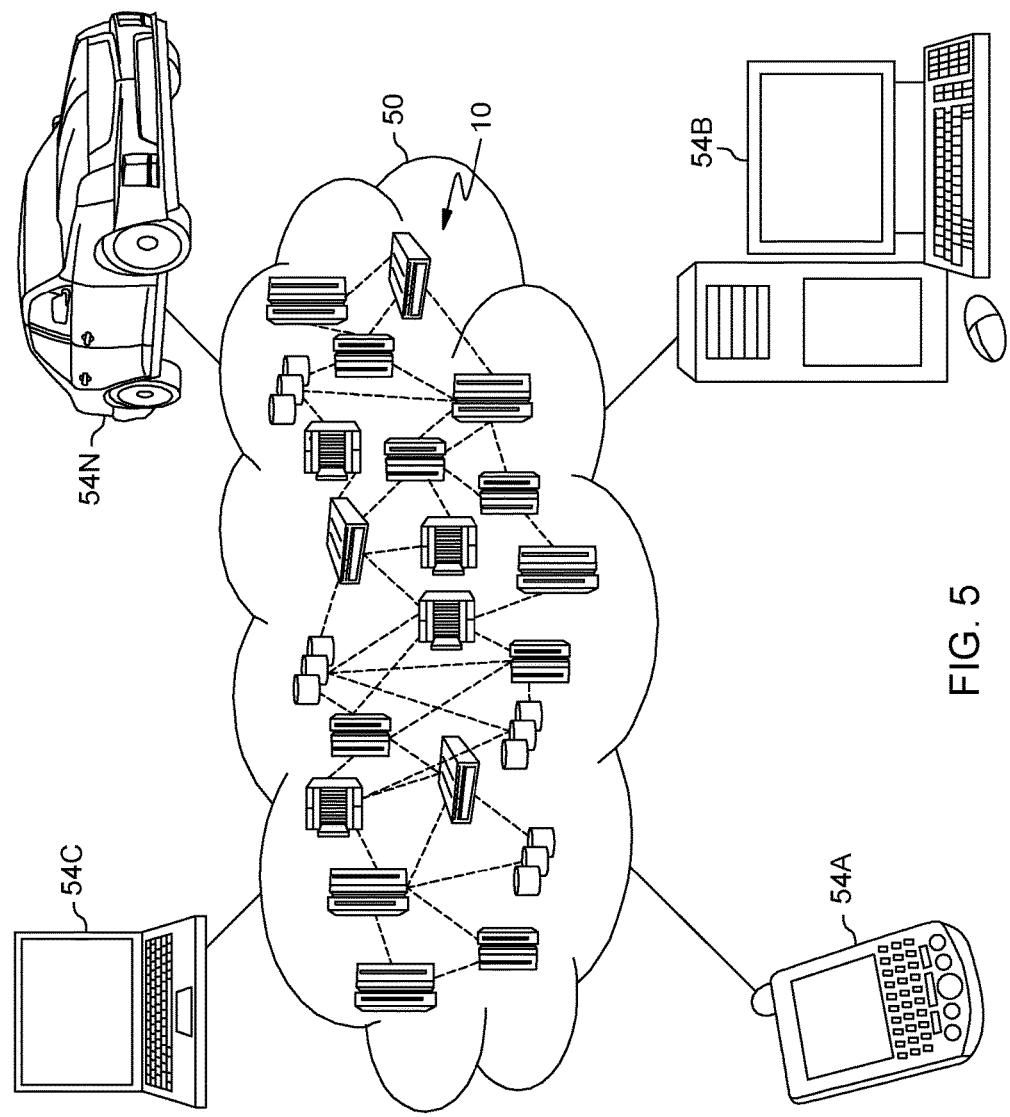
FIG. 5 depicts one embodiment of a cloud computing environment which may facilitate implementing, or be used in association with, one or more aspects of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
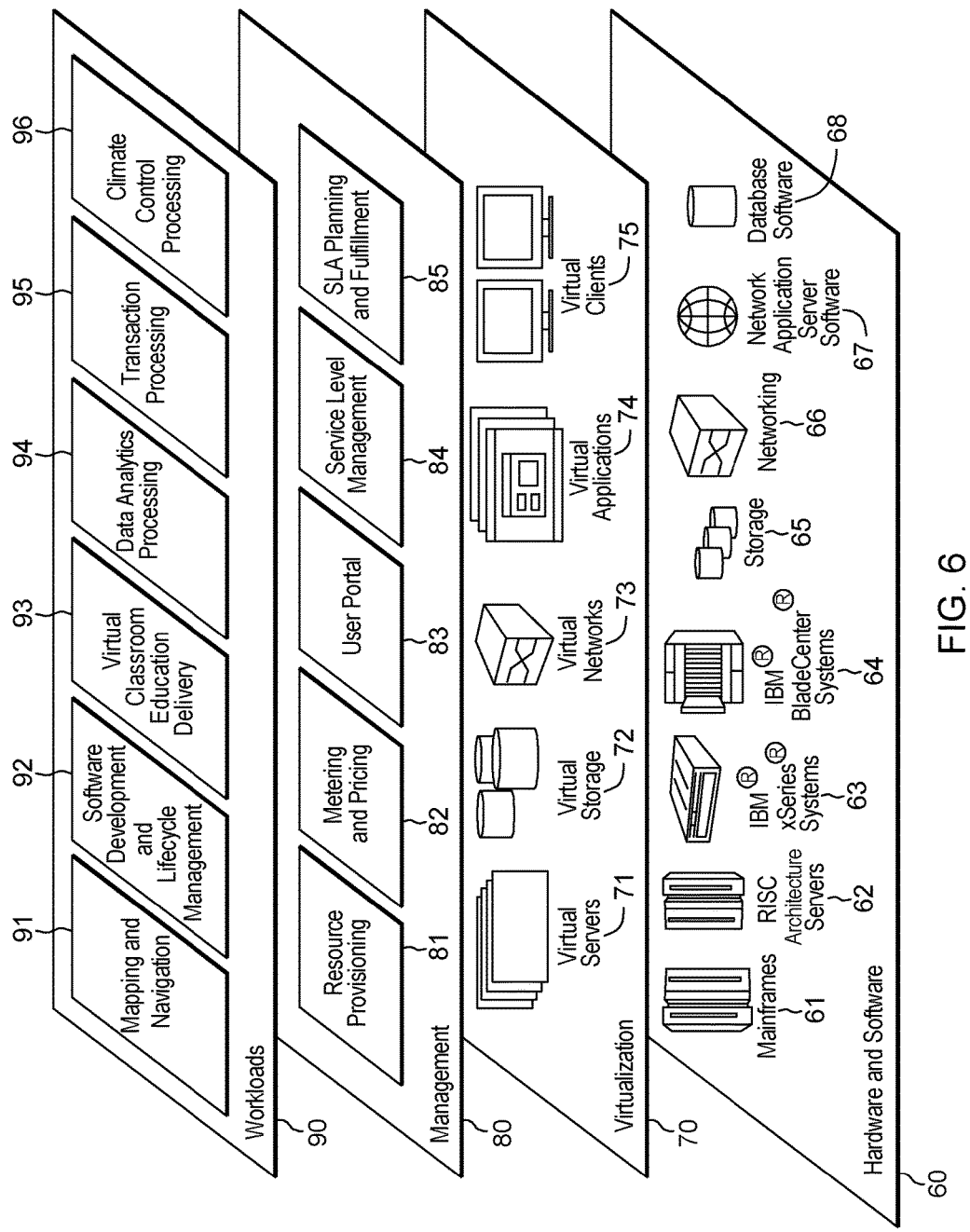
FIG. 6 depicts an example of extraction model layers, which may facilitate implementing climate control processing, in accordance with one or more aspects of the present invention.

Referring to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and climate control processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of controlling climate settings for a space, the method comprising:
   ascertaining, by a cognitive control, thermal-comfort-related data for multiple individuals within the space, the ascertaining comprising obtaining a preferred ambient temperature for each individual of the multiple individuals, the thermal-comfort-related data comprising the preferred ambient temperature(s) for the multiple individuals;
   determining and applying space-based climate settings for a climate system of the space using, at least in part, the thermal-comfort-related data of the multiple individuals within the space, wherein determining the space-based climate settings comprises determining the climate settings that meet a majority of the preferred ambient temperature(s) for the multiple individuals within the space;
   based on applying the space-based climate settings, identifying, by the cognitive control, a local climate adjustment to be made for an individual of the multiple individuals based, at least in part, on thermal-comfort-related data ascertained for the individual; and
   based on identifying the local climate adjustment, automatically controlling one or more climate adjusting devices of a plurality of climate adjustive devices of the space, the one or more climate adjusting devices being associated with a location of the individual within the space, and the one or more climate adjusting devices being controlled to enhance local climate of the individual within the space.

2. The method of claim 1, wherein ascertaining the thermal-comfort-related data comprises monitoring the multiple individuals within the space to obtain current physiological data for the multiple individuals within the space, the thermal-comfort-related data comprising the obtained current physiological data for the multiple individuals.

3. The method of claim 2, wherein the monitoring comprises using one or more physiological monitors associated with the multiple individuals to obtain the current physiological data.

4. The method of claim 2, wherein the monitoring the multiple individuals uses at least one item from the group consisting of a video camera, a smartphone, and natural language processing of verbal or text queues.

5. The method of claim 1, wherein the ascertaining comprises referencing historical data for the multiple individuals indicative of the preferred ambient temperature(s), and determining the climate settings includes weighting the preferred ambient temperature of one individual of the multiple individuals based on a projected length of time that the one individual is to be within the space.

6. The method of claim 5, further comprising ascertaining, by the cognitive control, the projected length of time that the one individual is to be in the space by referencing an electronic calendar of the one individual.

7. The method of claim 1, wherein the identifying further includes referencing historical data to cognitively ascertain a preferred ambient temperature for the individual, and based on the preferred ambient temperature, and the ascertained thermal-comfort-related data for the individual, identifying the climate adjustment to be made for the individual.

8. The method of claim 1, further comprising accounting for a climate impact within the space in controlling the climate adjusting device(s) associated with the location of the individual within the space, the accounting comprising adjusting one or more other climate settings for the space based on the controlling of the climate adjusting device(s) associated with the location of the individual within the space.

9. The method of claim 1, further comprising referencing, by the cognitive control, an electronic calendar of the individual to determine where the individual is coming from prior to entering the space, and based at least in part thereon, providing one or more short term settings of the climate adjusting device(s) associated with the location of the individual within the space.

10. The method of claim 1, wherein the automatically controlling comprises modifying control of the climate adjusting device(s) for a period of time based on historical data for the individual and the ascertained thermal-comfort-related data of the individual.

11. A system for controlling climate settings for a space, the system comprising:
  a memory; and
  a processor communicatively coupled to the memory, wherein the system performs a method comprising:
    ascertaining, by a cognitive control, thermal-comfort-related data for multiple individuals within the space, the ascertaining comprising obtaining a preferred ambient temperature for each individual of the multiple individuals, the thermal-comfort-related data comprising the preferred ambient temperature(s) for the multiple individuals;
    determining and applying space-based climate settings for a climate system of the space using, at least in part, the thermal-comfort-related data of the multiple individuals within the space, wherein determining the space-based climate settings comprises determining the climate settings that meet a majority of the preferred ambient temperature(s) for the multiple individuals within the space;
    based on applying the space-based climate settings, identifying, by the cognitive control, a local climate adjustment to be made for an individual of the multiple individuals based, at least in part, on thermal-comfort-related data ascertained for the individual; and
    based on identifying the local climate adjustment, automatically controlling one or more climate adjusting devices of a plurality of climate adjusting devices of the space, the one or more climate adjusting devices being associated within a location of the individual within the space, and the one or more climate adjusting device being controlled to enhance local climate of the individual within the space.

12. The system of claim 11, wherein ascertaining the thermal-comfort-related data comprises monitoring the multiple individuals within the space to obtain current physiological data for the multiple individuals within the space, the thermal-comfort-related data comprising the obtained current physiological data for the multiple individuals.

13. The system of claim 11, wherein the identifying further includes referencing historical data to cognitively ascertain a preferred ambient temperature for the individual, and based on the preferred ambient temperature, and the ascertained thermal-comfort-related data for the individual, identifying the climate adjustment to be made for the individual.

14. The system of claim 11, further comprising accounting for a climate impact within the space in controlling the climate adjusting device(s) associated with the location of the individual within the space, the accounting comprising adjusting one or more other climate settings for the space based on the controlling of the climate adjusting device(s) associated with the location of the individual within the space.

15. The system of claim 11, further comprising referencing, by the cognitive control, an electronic calendar of the individual to determine where the individual is coming from prior to entering the space, and based at least in part thereon, providing one or more short term settings of the climate adjusting device(s) associated with the location of the individual within the space.

16. The system of claim 11, wherein the automatically controlling comprises modifying control of the climate adjusting device(s) for a period of time based on historical data for the individual and the ascertained thermal-comfort-related data of the individual.

17. A computer program product for controlling climate settings for a space, the computer program product comprising:
  a computer readable storage medium having computer readable program code embodied therewith, the computer readable program code being executable by a processor to perform a method comprising:
    ascertaining, by a cognitive control, thermal-comfort-related data for multiple individuals within the space, the ascertaining comprising obtaining a preferred ambient temperature for each individual of the multiple individuals, the thermal-comfort-related data comprising the preferred ambient temperature(s) for the multiple individuals;
    determining and applying space-based climate settings for a climate system of the space using, at least in part, the thermal-comfort-related data of the multiple individuals within the space, determining the space-based climate settings comprises determining the climate settings that meet a majority of the preferred ambient temperature(s) for the multiple individuals within the space;
    based on applying the space-based climate settings, identifying, by the cognitive control, a local climate adjustment to be made for an individual of the multiple individuals based, at least in part, on thermal-comfort-related data ascertained for the individual; and based on identifying the local climate adjustment, automatically controlling one or more climate adjusting devices of a plurality of climate adjusting devices of the space, the one or more climate adjusting devices being associated with a location of the individual within the space, and the one or more climate adjusting devices being controlled to enhance local climate of the individual within the space.

* * * * *